April 4, 1950 S. JENCICK 2,502,790

FLEXIBLE COUPLING

Filed Dec. 2, 1946

INVENTOR.

STEPHEN JENCICK

BY Milburn & Milburn

Attorneys

Patented Apr. 4, 1950

2,502,790

UNITED STATES PATENT OFFICE 2,502,790

FLEXIBLE COUPLING

Stephen Jencick, Chagrin Falls, Ohio

Application December 2, 1946, Serial No. 713,541

3 Claims. (Cl. 64—14)

This invention relates to the art of flexible couplings.

The type of coupling, to which the present invention relates, comprises longitudinally and coaxially arranged driving and driven members with alternately disposed jaws or abutments between which there are provided resilient cushioning means, as for instance rubber or rubber-like material. The cushioning means, which comprises a plurality of sector-shaped portions arranged alternately with respect to the similarly formed jaws, would be apt to break away from their central core and to be completely dislodged by centrifugal force, except for some means to prevent.

It is therefore the object of my present invention to devise a flexible coupling of the type just referred to, with comparatively simple and hence inexpensive means for preventing accidental dislodgement of any of the sectors of the cushioning material, which might occur under the circumstances above described.

A further object is to devise such a means that is positive and dependable in the performance of its intended function as just explained.

Other objects will appear from the following description and claims when considered together with the accompanying drawing.

Figure 1:
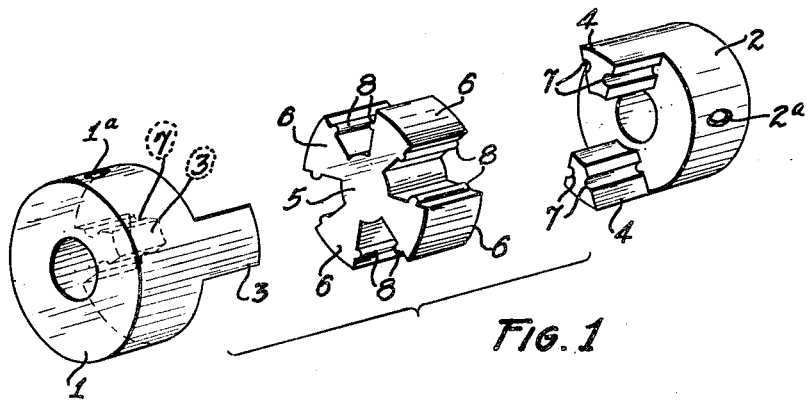
Fig. 1 is a combined perspective view of the three parts which make up my present improved coupling.

It is to be understood that the present form of disclosure is merely for the purpose of illustration and that there might be devised various modifications thereof without departing from the spirit of my invention as herein set forth and claimed.

In the form of my invention, as shown in the accompanying drawing, the coupling comprises the metal driving and driven members of duplicate form and an intermediate cushioning member of rubber or rubber-like material. That is to say, my present form of coupling comprises only three members, as will be more fully explained.

The driving and driven members, which are of duplicate form, comprise the hubs 1 and 2 which are provided with the holes 1a and 2a for set screws to affix the same to the drive and driven shafts, respectively, as indicated by reference letter S. Each hub 1 and 2 has, in the present form of device, two diametrically disposed duplicate jaws 3 and 4, respectively, projecting from the ends thereof, the outer surfaces of these jaws being flush with the outer surfaces of the hubs 1 and 2, respectively, and the inner surfaces of these jaws being of a form that is concentric with the longitudinal axis of the coupling. The jaws 3 and 4 are of substantially sector-like form, their side surfaces corresponding with radii of the hubs 1 and 2, respectively. As a result, the side surfaces of the two jaws, in each instance, coincide with intersecting diameters of the hubs 1 and 2, respectively. Thus the two jaws upon each of the hubs 1 and 2 are arranged in a balanced manner about the longitudinal axis of the coupling; and the two jaws of the one member are arranged in a balanced manner about the longitudinal axis with respect to the two jaws of the other member. Also, all of the jaws upon the two members are of the same length.

The cushioning means in my present device, consists of an integral body of rubber or rubber-like material with the central core 5 and the four radially extending sector-shaped projections 6 which are arranged equidistant from each other about the longitudinal axis thereof. The surface portions of the core 5, between the projections 6, are of concentric form corresponding to that of the inner surfaces of the jaws 3 and 4 so as to have snug engagement therewith; while the radial or side surfaces of the projections 6 are adapted for snug engagement with the corresponding surfaces of the jaws 3 and 4. That is to say, the cushioning element is designed to have snug engagement between the jaws 3 and 4 throughout so as to provide flexibility of the coupling and to absorb shock. The jaws 3 and 4 are of slightly less longitudinal extent than that of the projections 6 so as to prevent chattering between metal-to-metal contact between the ends of the jaws and the body of the other hub 1 or 2.

Due to the strain to which the cushioning element is subjected during its continual usage, there is the likelihood of the projections 6 breaking away from the central core 5 and there is the danger of such severed projections 6 being thrown radially outwardly and thus completely dislodged by centrifugal force except for some means to prevent. There have been attempts to remedy such a situation but I believe that my present arrangement constitutes a marked improvement from the standpoints of both simplicity of construction and efficiency of operation.

In the present case I provide the radial surfaces of the jaws 3 and 4 with the grooves 7 which are here shown of substantially semi-circular cross section and which are adapted for snug engagement with the correspondingly formed ribs or tongues 8 on the faces of the projections 6 of the cushioning means. It is important to note that this interengaging tongue and groove means extends substantially medially along the surfaces of the jaws 3 and 4 and the projections 6 and that they are of substantial extent in the direction corresponding with the circumference of the coupling. These tongues and grooves extend the full length of the jaws 3 and 4 and the projections 6 and are arranged co-axially about the longitudinal axis of the coupling.

As a result of my present arrangement, there is precluded any danger of the sector-shaped projections 6 being accidentally dislodged by centrifugal force in case of their becoming severed from the core 5. The tongues and grooves, herein provided for this purpose, are so designed as to act in a positive and dependable manner and without the aid of any other provision for this purpose. Thus there is produced a comparatively simple and inexpensive but highly efficient form of device. This coupling comprises only the three parts; namely, the two metal hubs and the intermediate cushioning element. My present form of coupling is especially adapted for use in cases of comparatively light duty although I do not wish to place any limitation upon my invention as to size.

Figure 2:
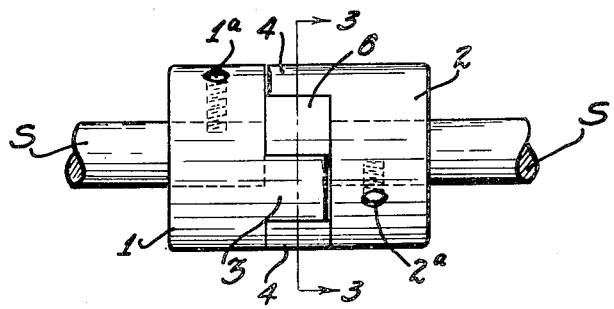
Fig. 2 is an elevation of my present device in assembly.
Figure 3:
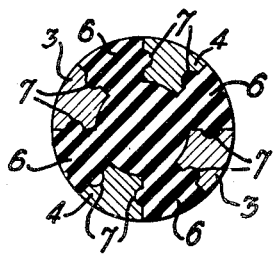
Fig. 3 is a sectional view taken on line 3—3 of Fig. 2.

This coupling can be very easily assembled; and, as indicated in Fig. 2 for instance, this coupling when completely assembled is of a substantially cylindrical form with a substantially uniformly smooth outer surface throughout. When the parts are placed in assembly, this is very readily accomplished by sliding the tongue and groove means into effective engagement with the result indicated in Fig. 2. These parts have such snug and effective interengagement that no other means is required to maintain them in assembly and in order to produce the marked improvement above noted.

What I claim is:

1. A flexible coupling, comprising a driving member, a driven member, said members being arranged co-axially with respect to each other, each of said members having a plurality of co-axially arranged spaced jaws projecting therefrom, the jaws of the one member having alternating arrangement with respect to the jaws of the other member, resilient means arranged between and having operative engagement with the sides of said jaws so as to provide cushioning action therebetween, and interengaging tongues and grooves provided upon the adjacent surfaces of said jaws and resilient means and extending longitudinally the entire length thereof and arranged co-axially with respect to the longitudinal axis of the coupling, for preventing radial dislodgement of said resilient means by centrifugal force during rotative movement of the coupling.

2. A flexible coupling, comprising a driving member, a driven member, said members being arranged co-axially with respect to each other, each of said members having a plurality of co-axially arranged spaced jaws projecting therefrom, the jaws of the one member having alternating arrangement with respect to the jaws of the other member, a unitary resilient element having radially disposed projections arranged between and having operative engagement with the sides of said jaws so as to provide cushioning action therebetween, the adjacent surfaces of said jaws and projections having interengaging integral tongue and groove means extending longitudinally the entire length thereof and arranged co-axially with respect to the longitudinal axis of the coupling, so as to prevent radial dislodgement of said projections by centrifugal force during rotative movement of the coupling, the space between said jaws being otherwise free of obstruction.

3. A flexible coupling, comprising a driving member, a driven member, said members being arranged co-axially with respect to each other, each of said members having a plurality of co-axially arranged spaced jaws projecting therefrom, the jaws of the one member having alternating arrangement with respect to the jaws of the other member, a unitary resilient element having radially disposed projections arranged between and having operative engagement with the sides of said jaws so as to provide cushioning action therebetween, the adjacent surfaces of said jaws and projections having interengaging integral tongue and groove means extending longitudinally the entire length thereof and arranged co-axially with respect to the longitudinal axis of the coupling, said tongue and groove means being of substantial extent in the direction corresponding to the circumference of the coupling and of limited extent in a direction radially of the coupling, so as to prevent in a positive and dependable manner the accidental radial dislodgement of said projections by centrifugal force during rotative movement of the coupling, the space between said jaws being otherwise free of obstruction.

STEPHEN JENCICK.

REFERENCES CITED

The following references are of record in the file of this patent:

UNITED STATES PATENTS

| Number | Name | Date |
| --- | --- | --- |
| 1,679,992 | Short | Aug. 7, 1928 |
| 1,791,763 | Peters | Feb. 10, 1931 |
| 2,213,277 | Guy | Sept. 3, 1940 |